United States Patent
Goodman et al.

(10) Patent No.: US 11,694,020 B2
(45) Date of Patent: *Jul. 4, 2023

(54) SYSTEMS AND METHODS FOR XBRL TAG SUGGESTION AND VALIDATION

(71) Applicant: WORKIVA INC., Ames, IA (US)

(72) Inventors: Rollie Diane Goodman, Philadelphia, PA (US); Houston Dean King, Bozeman, MT (US); Michael Breecher, Phoenix, AZ (US); Edward Joseph Cupps, Ames, IA (US); Alex Kharbush, Boulder, CO (US)

(73) Assignee: WORKIVA INC., Ames, IA (US)

( * ) Notice: Subject to any disclaimer, the term of this patent is extended or adjusted under 35 U.S.C. 154(b) by 51 days.

This patent is subject to a terminal disclaimer.

(21) Appl. No.: 17/368,187

(22) Filed: Jul. 6, 2021

(65) Prior Publication Data

US 2022/0138403 A1   May 5, 2022

Related U.S. Application Data

(63) Continuation of application No. 17/089,211, filed on Nov. 4, 2020, now Pat. No. 11,087,070.

(51) Int. Cl.
G06F 40/117 (2020.01)
G06N 3/08 (2023.01)
(Continued)

(52) U.S. Cl.
CPC ........ *G06F 40/117* (2020.01); *G06F 18/2148* (2023.01); *G06F 40/14* (2020.01);
(Continued)

(58) Field of Classification Search
CPC ...... G06F 40/117; G06F 40/14; G06F 40/226; G06F 17/2264; G06F 17/211;
(Continued)

(56) References Cited

U.S. PATENT DOCUMENTS 8,990,202 B2   3/2015   Smith et al.
9,146,912 B1   9/2015   Benjamin et al.
(Continued)

OTHER PUBLICATIONS

Xing et al., .(NPL—"Intelligent Asset Management" published 2019 by Springer Nature Switzerland AG—163 pages (Year: 2019).*

(Continued)

*Primary Examiner* — Quoc A Tran
(74) *Attorney, Agent, or Firm* — Faegre Drinker Biddle & Reath LLP

(57) ABSTRACT

Disclosed are systems and methods for XBRL tag suggestion and validation. In some embodiments, the method includes the steps of: receiving an XBRL document associated with one or more assigned XBRL tags; analyzing the XBRL document using a trained machine learning model to generate one or more suggested XBRL tags and determine one or more corresponding confidence values; comparing the one or more assigned XBRL tags with the one or more suggested XBRL tags to generate comparison results; and determining a tag confidence value associated with each assigned XBRL tag of the one or more assigned XBRL tags based on the comparison results.

19 Claims, 8 Drawing Sheets

(51) Int. Cl.
  *G06N 3/04*  (2023.01)
  *G06F 40/226*  (2020.01)
  *G06F 40/14*  (2020.01)
  *G06F 18/214*  (2023.01)
  *G06F 17/00*  (2019.01)

(52) U.S. Cl.
  CPC .............. *G06F 40/226* (2020.01); *G06N 3/04* (2013.01); *G06N 3/08* (2013.01)

(58) Field of Classification Search
  CPC ..... G06F 17/2785; G06F 17/278; G06N 3/08; G06N 3/04; G06K 9/6257
  See application file for complete search history.

(56) References Cited

U.S. PATENT DOCUMENTS

| | | |
|---|---|---|
| 9,348,854 B1 | 5/2016 | Haila |
| 9,798,703 B2 | 10/2017 | Haila et al. |
| 2013/0007033 A1* | 1/2013 | Brown ............... G06N 5/02 707/768 |
| 2013/0117268 A1* | 5/2013 | Smith ............... G06Q 40/12 707/739 |
| 2013/0262981 A1 | 10/2013 | Haila et al. |
| 2017/0069020 A1 | 3/2017 | Goyal et al. |

OTHER PUBLICATIONS

XBRL International Inc., "Extensible Business Reporting Language (XBRL) 2.1," Recommendation Dec. 31, 2003 with errata corrections to Feb. 20, 2013, retrieved from internet at <http://www.xbrl.org/Specification/KBRL-2.1/REC-2003-12-31/XBRL-2.1-REC-2003-12-31+corrected-errata-2013-02-20.html> on Nov. 4, 2020, 166 pages.
Xing et al., "Intelligent Asset Management," Socio-Affective Computing, 2019, Springer Nature Switzerland AG, vol. 9, 156 pages.
PCT Search Report and Written Opinion issued in related application PCT/US2021/050392, dated Oct. 5, 2021, 13 pages.

* cited by examiner

| (in millions, except per share data) | Three months ended September 30, 2018 | | Three months ended September 30, 2017 | Nine months ended September 30, 2018 | | Nine months ended September 30, 2017 |
|---|---|---|---|---|---|---|
| Revenue | | | | | | |
| Investment banking fees | | $ | 1,868 | | $ | 5,594 |
| | | | | 5,736 | | |
| Principal transactions | | | 2,721 | 10,698 | | 9,440 |
| Lending- and deposit-related fees | | | 1,497 | 4,514 | | 4,427 |
| Asset management, administration and commissions | | | 4,072 | 12,923 | | 11,996 |
| Investment securities losses | | | (1) | (377) | | (38) |
| Mortgage fees and related income | | | 429 | 1,051 | | 1,239 |
| Card income | | | 1,242 | 3,623 | | 3,323 |
| Other income | | | 952 | 4,041 | | 3,197 |
| Noninterest revenue | | | 12,780 | 42,215 | | 39,178 |
| Interest income | | | 16,687 | 56,404 | | 47,379 |
| Interest expense | | | 3,889 | 15,699 | | 10,309 |
| Net interest income | | | 12,798 | 40,705 | | 37,070 |
| Total net revenue | | | 25,578 | 82,920 | | 76,248 |
| Provision for credit losses | | | 1,452 | 3,323 | | 3,982 |
| Noninterest expense | | | | | | |
| Compensation expense | | | 7,697 | 25,308 | | 23,710 |
| Occupancy expense | | | 930 | 2,883 | | 2,803 |
| Technology, communications and equipment expense | | | 1,972 | 6,441 | | 5,677 |
| Professional and outside services | | | 1,955 | 6,333 | | 5,646 |
| Marketing | | | 710 | 2,396 | | 2,179 |
| Other expense | | | 1,306 | 4,313 | | 4,605 |
| Total noninterest expense | | | 14,570 | 47,674 | | 44,620 |

*— 300*

*15,623*

301

Attributes

Professional and Contract Services Expense

Tag  us-gaap:ProfessionalAndContractServicesExpense
Fact  6,333,000,000
Period  9 months ending 09/30/2018
Measure  USD
Scale  Millions
Decimals  Millions
Balance  Debit
Sign  Positive
Type  Monetary Item Type

SYSTEMS AND METHODS FOR XBRL TAG SUGGESTION AND VALIDATION

CROSS-REFERENCE TO RELATED APPLICATIONS

This application is a continuation of U.S. patent application Ser. No. 17/089,211, filed Nov. 4, 2020, which is incorporated herein by reference.

TECHNICAL FIELD

The present disclosure relates to reporting of business data in documents using the XBRL (eXtensible Business Reporting Language), and more particularly to systems and methods for automated XBRL document tag suggestions and validations.

BACKGROUND

XBRL is a standardized computer language by which businesses may efficiently and accurately communicate business data with each other and with regulating agencies. Extensible Business Reporting Language (XBRL) 2.1 is available at http://www.xbrl.org/Specification/XBRL-2.1/REC-2003-12-31/XBRL-2.1-REC-2003-12-31+corrected-errata-2013-02-20.html. XBRL is a markup language not too dissimilar from XML (eXtensible Markup Language) and HTML (Hyper Text Markup Language). HTML was designed to display general-purpose data in a standardized way, XML was designed to transport and store general-purpose data in a standardized way, and XBRL was designed to transport and store business data in a standardized way.

Taxonomies are the report and subject specific dictionaries used by the XBRL community. Taxonomies include specific tags, referred to as XBRL tags, which are used for individual items of data (e.g., "Revenues", "Operating expenses"), their attributes and their interrelationships. Different taxonomies are often required for different business reporting purposes.

XBRL is bringing about a dramatic change in the way people think about exchanging business information. Financial disclosures are a prime example of an industry built around a paper-based process that is being pushed into the technological age. This transition involves a paradigm shift from the pixel perfect world of building unstructured reports to a digital world where structured data is dominant.

SUMMARY

At least some aspects of the present disclosure are directed to a method for XBRL tag validation. The method is implemented on a computer system having one or more processors and memories. The method includes the steps of: receiving an XBRL document associated with one or more assigned XBRL tags; analyzing the XBRL document using a trained machine learning model to generate one or more suggested XBRL tags and determine one or more corresponding confidence values, each suggested XBRL tag of the one or more suggested XBRL tags associated with a confidence value; comparing the one or more assigned XBRL tags with the one or more suggested XBRL tags to generate comparison results; and determining a tag confidence value associated with each assigned XBRL tag of the one or more assigned XBRL tags based on the comparison results.

At least some aspects of the present disclosure are directed to a method for XBRL tag suggestion. The method is implemented on a computer system having one or more processors and memories. The method includes the steps of: receiving a plurality of XBRL datasets; training a machine learning model using the plurality of XBRL datasets; receiving a document; and predicting one or more XBRL tags associated with the document using the trained machine learning model, where at least a part of the plurality of XBRL datasets each comprises at least one of a row header and a table type.

BRIEF DESCRIPTION OF THE DRAWINGS

The accompanying drawings are incorporated in and constitute a part of this specification and, together with the description, explain the features and principles of the disclosed embodiments. In the drawings.

FIG. 3 depicts one illustrative example of a document with a predicted/suggested XBRL tag;

FIG. 6 depicts one illustrative example of a representation of an XBRL document with assigned XBRL tags and tag confidence values.

DETAILED DESCRIPTION

Unless otherwise indicated, all numbers expressing feature sizes, amounts, and physical properties used in the specification and claims are to be understood as being modified in all instances by the term "about." Accordingly, unless indicated to the contrary, the numerical parameters set forth in the foregoing specification and attached claims are approximations that can vary depending upon the desired properties sought to be obtained by those skilled in the art utilizing the teachings disclosed herein. The use of numerical ranges by endpoints includes all numbers within that range (e.g. 1 to 5 includes 1, 1.5, 2, 2.75, 3, 3.80, 4, and 5) and any range within that range.

Although illustrative methods may be represented by one or more drawings (e.g., flow diagrams, communication flows, etc.), the drawings should not be interpreted as implying any requirement of, or particular order among or between, various steps disclosed herein. However, certain some embodiments may require certain steps and/or certain orders between certain steps, as may be explicitly described herein and/or as may be understood from the nature of the steps themselves (e.g., the performance of some steps may depend on the outcome of a previous step). Additionally, a "set," "subset," or "group" of items (e.g., inputs, algorithms, data values, etc.) may include one or more items, and, similarly, a subset or subgroup of items may include one or more items. A "plurality" means more than one.

As used herein, the term "based on" is not meant to be restrictive, but rather indicates that a determination, identification, prediction, calculation, and/or the like, is performed by using, at least, the term following "based on" as an input. For example, predicting an outcome based on a particular piece of information may additionally, or alternatively, base the same determination on another piece of information.

One of the ongoing challenges faced by those preparing financial statements or other business reports with XBRL is selecting the correct XBRL tags from thousands of XBRL tags. At least some embodiments of the present disclosure are directed to systems and methods for XBRL tag suggestion using a trained machine learning model. In some cases, a trained machine learning model can predict XBRL tags with higher than 95% accuracy. In some embodiments, each suggested XBRL tag is associated with a confidence value. As used herein, a confidence value refers to the probability that a given tag is correct, based on the inputs supplied to the trained machine learning model and the data upon which the machine learning model was trained. At least some embodiments of the present disclosure are directed to systems and methods for XBRL tag validation by comparing tag(s) suggested by a trained machine learning model with tag(s) in XBRL documents.

Figure 1:
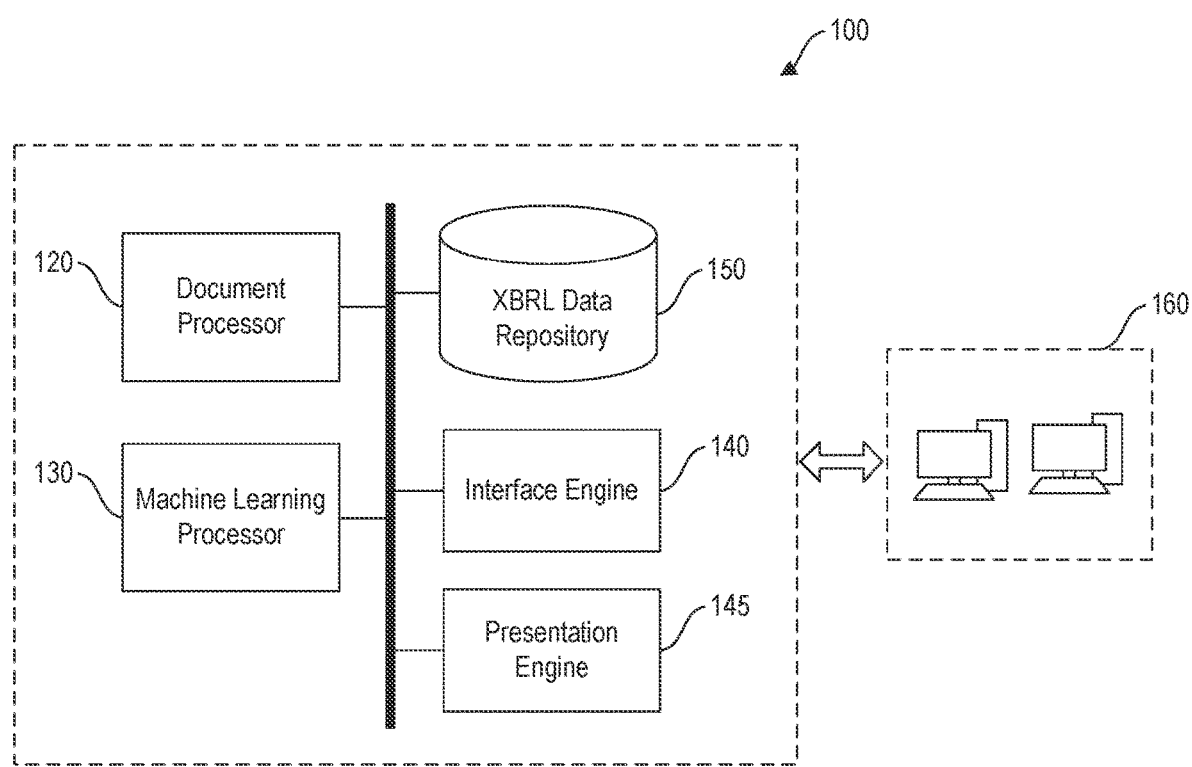
FIG. 1 depicts an illustrative system diagram of an XBRL tag suggestion/validation system, in accordance with certain embodiments of the present disclosure.

FIG. 1 depicts an illustrative system diagram of an XBRL tag suggestion/validation system 100, in accordance with certain embodiments of the present disclosure. As illustrated, the system 100 includes a document processor 120, a machine learning processor 130, an interface engine 140, a presentation engine 145, and a XBRL data repository 150. One or more components of the system 100 are optional. In some cases, the system 100 can include additional components. In some cases, the system 100 interfaces with one or more other systems 160, for example, a filing system, a finance system, a vendor system, and/or the like.

In some embodiments, the document processor 120 includes natural language processing functionalities. In some cases, the document processor 120 parses the received documents into n-grams and generate a plurality of terms based on the n-grams. As used herein, n-gram refers to a contiguous sequence of n words including numbers and symbols from a data stream, which typically is a phrase or a sequence of words with meaning. N-gram can include numbers and symbols, such as a comma, a period, a dollar sign, and/or the like. In some cases, the document processor 120 normalizes the parsed n-grams. Further, in some cases, the document processor 120 generates a plurality of normalized sections having normalized terms based on the n-grams. In one example, the plurality of intake terms include normalized n-grams. As one example, the n-grams is a date and the normalized term is the date in a predefined format (e.g., year-month-date). In some cases, the document processor 120 determines contexts of the normalized terms. In one example, the contexts are a part of a same sentence of the normalized terms. In one example, the natural language processor 120 parses the n-grams and labels the n-grams based on the contexts, for example, period, expense, revenue, etc. In some embodiments, a document processor 120 uses a natural language model for processing the document and parsed n-grams. For example, a natural language model can be a statistical language model, a neural network language model, and/or the like.

In some embodiments, the machine learning processor 130 is configured to train a machine learning model using XBRL datasets and use the trained machine learning model to predict XBRL tags associated with input documents, including XBRL documents. As used herein, an XBRL document refers to a document being tagged with one or more XBRL tags. The machine learning model may include any suitable machine learning models, deep learning models, and/or the like. In some cases, the trained machine learning model includes at least one of a decision tree, a random forest, a support vector machine, a neural network, a convolutional neural network, a recurrent neural network, and/or the like. In some embodiments, the XBRL tag suggestion system receives a plurality of XBRL datasets for training and/or testing. In some cases, the system may select a subset of XBRL datasets for training. In some cases, the subset of XBRL datasets are selected based on a completeness of the XBRL datasets. In some cases, the first subset of XBRL datasets are selected based on a taxonomy of the XBRL datasets. In some cases, a subset of the XBRL datasets are used for testing (e.g., one third of the XBRL datasets). In some cases, the XBRL datasets or subsets selected as training data are compiled to include row header data with corresponding XBRL data and metadata. The metadata can include SIC ("Standard Industry Classification") codes, table types, and/or the like.

In some embodiments, the machine learning model comprises a neural network. In some cases, the neural network comprises a plurality of layers. In one embodiment, the neural network includes at least an input layer, a concatenate layer, and a dropout layer, with one example illustrated in FIG. 4. In some embodiments, the machine learning processor 130 receives a document, for example, a business document, a reporting document, a compliance document, and/or the like. In some cases, the machine learning processor 130 can receive the document via the interface with other systems 160. In some cases, the machine learning processor 130 can receive the document via retrieving the document via the XBRL data repository 150.

The machine learning processor 130 is configured to predict one or more XBRL tags associated with the document using the trained machine learning model. FIG. 3 is one illustrative example of a document 300 with a predicted XBRL tag 301. In this example, data relevant to the XBRL tag is stored in a data structure for the XBRL tag 301. In some embodiments, the system predicts one or more XBRL tags associated with a section of the document.

In some embodiments, the machine learning processor 130 is configured to determine one or more confidence values, where each of one or more tags is associated with a respective confidence value. In some embodiments, the machine learning processor 130 is configured to apply a multivariable function to the document to determine the confidence values. An example multivariable function is a softmax function. In one example, the softmax function is implemented as a layer of the neural network that the machine learning processor 130 uses to analyze the document.

In some embodiments, the machine learning processor 130 may determine a set of selected XBRL tags and generate an output of the selected XBRL tags. The selected XBRL tags can be stored in the XBRL data repository 150. In one embodiment, the system may determine the set of selected XBRL tags based at least in part on the confidence values. In one example, each of the set of selected XBRL tags has a highest confidence value of confidence values corresponding to the group of suggested XBRL tags associated with the same document section. In some embodiments, the system may determine the set of selected XBRL tags based at least in part on user input(s). The selected XBRL tags can be used to tag the document.

In some embodiments, the system 100 performs a review/validation process to an XBRL document associated with one or more assigned tags. In some embodiments, the XBRL document comprises a plurality of sections, where each assigned tag is associated with a respective section of the XBRL document. In some cases, the machine learning processor 130 analyzes each section of the plurality of sections and determines one or more suggested XBRL tags for each section. In some embodiments, the machine learning processor 130 determines a confidence value for each suggested tag of the one or more suggested tags.

In some embodiments, the machine learning processor 130 can compare the one or more assigned tags with the one or more suggested tags to generate comparison results. The comparison results may include one or more assigned tags matching with one or more suggested tags. The comparison results may include that one or more assigned tags do not match with any suggested tags. In one embodiment, the comparison results may include, for each tagging section associated with a respective assigned tag and one or more suggested tags, whether the respective assigned tag matches any one of the one or more suggested tags.

In some embodiments, the machine learning processor 130 can determine a tag confidence value for each assigned tag based on the comparison results. In some embodiments, the tag confidence value of an assigned tag is set to equal to the matching suggested tag (e.g., 95%). In some embodiments, the tag confidence value of an assigned tag is set to equal to the matching suggested tag of the one or more suggested tags for the corresponding tagging section. In one embodiment, the tag confidence value of an assigned tag is set to a logical low if the assigned tag does not match any one of the one or more suggested section tags for the corresponding tagging section. In one embodiment, a logical low is represented by 0%. In some cases, a tagging section can be a table (e.g., statement of earning table, etc.). In some cases, a tagging section can represent hierarchy in a respective XBRL taxonomy. For example, a document can include one or more tagging sections, and each tagging section can include one or more subsections.

Optionally, the machine learning processor 130 can determine a category for each tag confidence value. In one embodiment, the tag confidence categories can include a high confidence category, a medium confidence category, and a low confidence category. In one embodiment, each tag confidence category of the tag confidence categories is associated with a predetermined range. For example, a high confidence category corresponds to a confidence value within a range of 40%-100%, a medium confidence category corresponds to a confidence value within a range of 10%-40%, and a low confidence category corresponds to a confidence value within a range of 0%-10%. In another embodiment, the tag confidence categories can include more than three (3) categories. In yet another embodiment, the tag confidence categories can include two (2) categories.

In some embodiments, the interface engine 140 is configured to interface with other systems 160. In some embodiments, the interface engine 140 is configured to connect to an electronic filing system or a finance system 160 via a software interface. In some cases, the interface engine 140 is configured to use a set of predetermined protocol through the software interface. In some cases, the software interface comprises at least one of an application programming interface and a web service interface.

Figure 5:
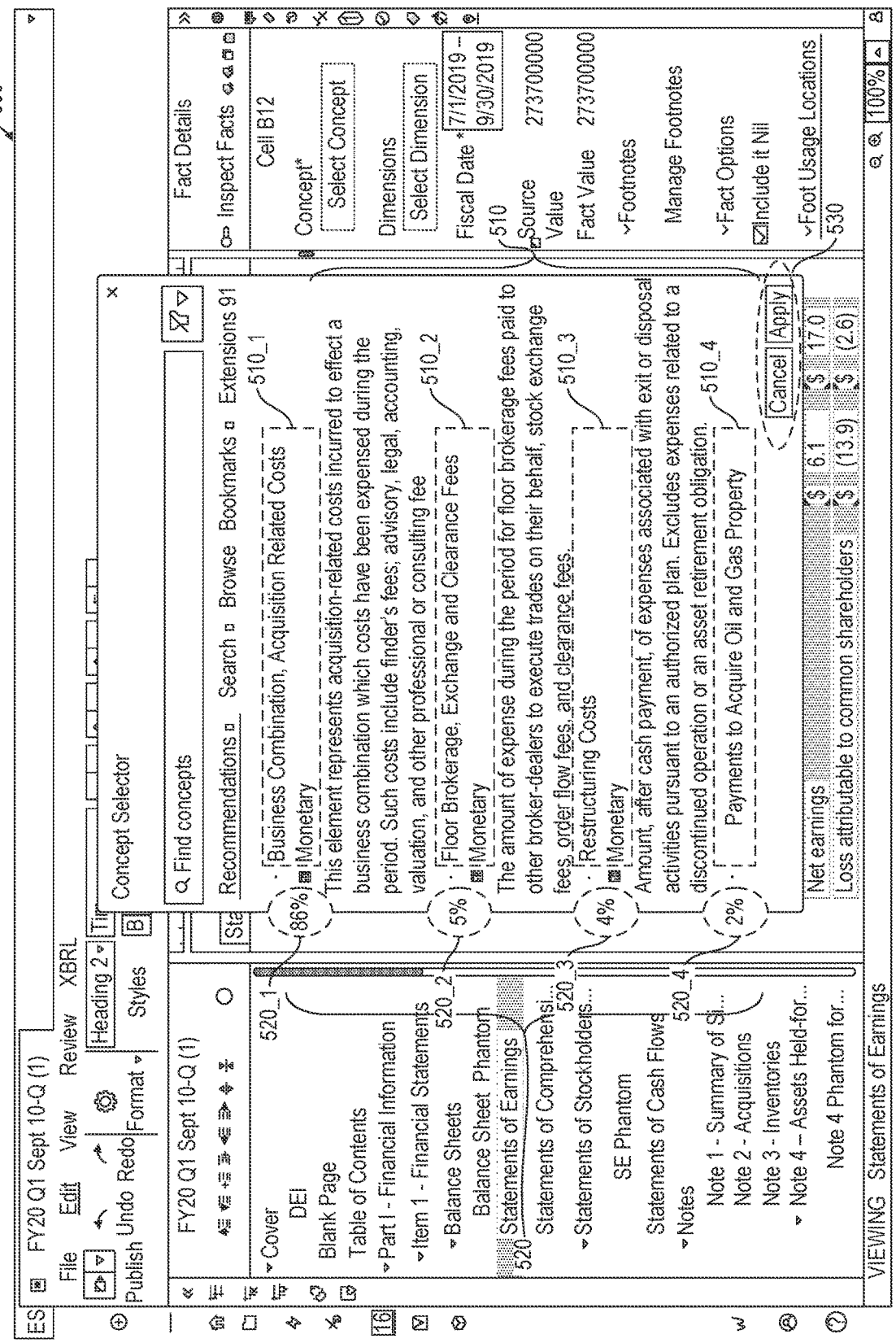
FIG. 5 depicts one illustrative example of a graphical user interface for an XBRL tag suggestion system.
Figure 6:
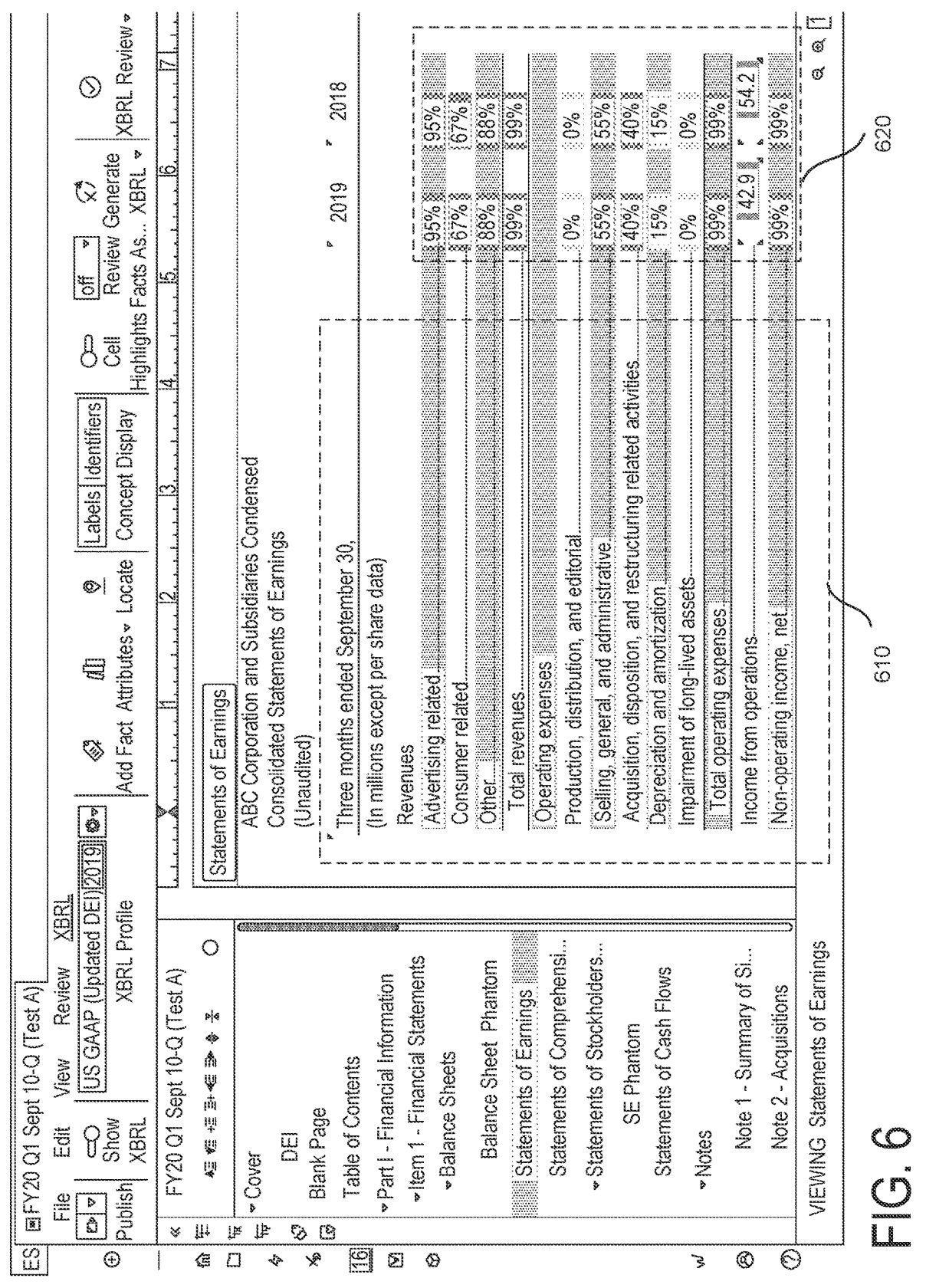

In some embodiments, the presentation processor 145 is configured to generate a representation of XBRL document, suggested/predicted XBRL tags, labels of suggested/predicted XBRL tags, and/or tag confidence values. In some cases, a representation indicative of an XBRL tag includes a representation of a label associated with the tag. One illustrative example of the graphical user interface is depicted in FIG. 5, which shows for an XBRL document or document section, the recommended/suggested XBRL tags 510, represented by associated labels, and associated confidence values 520. In some cases, the graphical user interface is received by a client application and rendered on a computing device of a user. In some cases, the presentation processor 145 is configured to receive inputs or requests submitted by users. In the example of FIG. 5, a user can click on a button 530 to submit a user input. In this example, the input received is a user selection. Another illustrative example of representation is depicted in FIG. 6, which shows a review of an XBRL document with labels of XBRL tags 610 and the corresponding tag confidence values 620 determined by a tag validation system. In some cases, the presentation engine can be configured to render representations to users. In some cases, the presentation engine 145 receives a type of a computing device (e.g., laptop, smart phone, tablet computer, etc.) of the user and is configured to generate a graphical presentation adapted to the computing device type.

In some embodiments, the representation of the tag confidence values includes an indication of corresponding categories of the tag confidence values. In one example, the tag confidence categories are represented by colors. For example, a high confidence category is represented by green, a medium confidence category is represented by yellow, and a low confidence category is represented by red. FIG. 6 depicts one illustrative example of a representation of an XBRL document with labels of assigned XBRL tags 610 and tag confidence values 620. In one embodiment, an indication of a tag confidence category for each tag confidence value is included in the representation.

In some embodiments, the XBRL data repository 150 can include taxonomy data, XBRL datasets, suggested XBRL tags, selected XBRL tags, documents (including XBRL documents) received for analysis, and/or the like. The XBRL data repository 150 may be implemented using any one of the configurations described below. A data repository may include random access memories, flat files, XML files, and/or one or more database management systems (DBMS) executing on one or more database servers or a data center. A database management system may be a relational (RDBMS), hierarchical (HDBMS), multidimensional (MDBMS), object oriented (ODBMS or OODBMS) or object relational (ORDBMS) database management system, and the like. The data repository may be, for example, a single relational database. In some cases, the data repository may include a plurality of databases that can exchange and aggregate data by data integration process or software application. In an exemplary embodiment, at least part of the data repository may be hosted in a cloud data center. In some cases, a data repository may be hosted on a single computer, a server, a storage device, a cloud server, or the like. In some other cases, a data repository may be hosted on a series of networked computers, servers, or devices. In some cases, a data repository may be hosted on tiers of data storage devices including local, regional, and central.

In some cases, various components of the system 100 can execute software or firmware stored in non-transitory computer-readable medium to implement various processing steps. Various components and processors of the system 100 can be implemented by one or more computing devices, including but not limited to, circuits, a computer, a cloud-based processing unit, a processor, a processing unit, a microprocessor, a mobile computing device, and/or a tablet computer. In some cases, various components of the system 100 (e.g., the document processor 120, the machine learning processor 130, the interface engine 140, the presentation engine 150) can be implemented on a shared computing device. Alternatively, a component of the system 100 can be implemented on multiple computing devices. In some implementations, various modules and components of the system 100 can be implemented as software, hardware, firmware, or a combination thereof. In some cases, various components of the XBRL tag suggestion/validation system 100 can be implemented in software or firmware executed by a computing device.

Various components of the system 100 can communicate via or be coupled to via a communication interface, for example, a wired or wireless interface. The communication interface includes, but not limited to, any wired or wireless short-range and long-range communication interfaces. The short-range communication interfaces may be, for example, local area network (LAN), interfaces conforming known communications standard, such as Bluetooth® standard, IEEE 802 standards (e.g., IEEE 802.11), a ZigBee® or similar specification, such as those based on the IEEE 802.15.4 standard, or other public or proprietary wireless protocol. The long-range communication interfaces may be, for example, wide area network (WAN), cellular network interfaces, satellite communication interfaces, etc. The communication interface may be either within a private computer network, such as intranet, or on a public computer network, such as the internet.

Figure 2A:
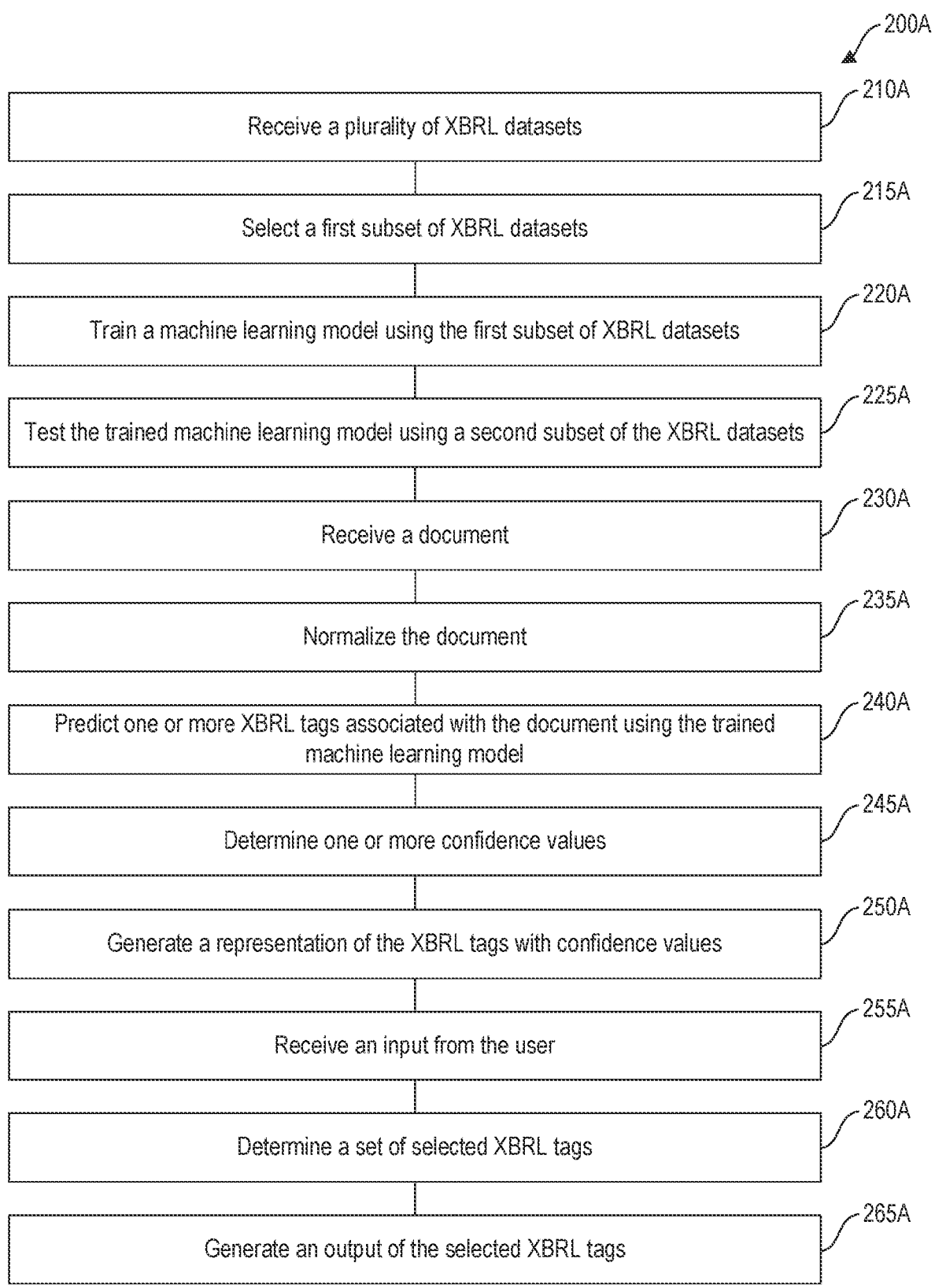
FIG. 2A depicts one illustrative flow diagram of an XBRL tag suggestion system, in accordance with certain embodiments of the present disclosure.

FIG. 2A depicts one illustrative flow diagram of an XBRL tag suggestion system, in accordance with certain embodiments of the present disclosure. Aspects of embodiments of the method 200A may be performed, for example, by components of a XBRL tag suggestion system (e.g., components of the XBRL tag suggestion/validation system 100 of FIG. 1). One or more steps of method 200A are optional and/or can be modified by one or more steps of other embodiments described herein. Additionally, one or more steps of other embodiments described herein may be added to the method 200A. In some embodiments, the XBRL tag suggestion system receives a plurality of XBRL datasets (210A). In some cases, the system may select a first subset of XBRL datasets (215A). In some cases, the first subset of XBRL datasets are selected based on a completeness of the XBRL datasets. In some cases, the first subset of XBRL datasets are selected based on a taxonomy of the XBRL datasets. In some cases, a subset of the XBRL datasets are used for testing (e.g., one third of the XBRL datasets). In some cases, at least a part of the plurality of XBRL datasets each comprises a row header. In some designs, the row header is represented by a vector. In some designs, the row header is represented by a dense vector. In one example, a dense vector condenses information in the text used in the row header into a numeric format, which can be usable by machine learning models. In some cases, at least a part of the plurality of XBRL datasets each comprises a table type. In some cases, at least a part of the plurality of XBRL datasets each comprises an industry category.

In some embodiments, the XBRL tag suggestion system trains a machine learning model using the first subset of XBRL datasets (220A), or the XBRL datasets. The training process may use, for example, a process illustrated in FIG. 2C. In some cases, the XBRL datasets or subsets used for training data are compiled to include row header data with corresponding XBRL data and metadata. The metadata can include SIC codes, table types, and/or the like. The machine learning model may include any suitable machine learning models, deep learning models, and/or the like. In some embodiments, the machine learning model includes at least one of a decision tree, random forest, support vector machine, convolutional neural network, recurrent neural network, and/or the like. Optionally, the system may test the trained machine learning model using a second subset of the XBRL datasets. In one embodiment, the first subset of the XBRL datasets and the second subset of the XBRL datasets do not have any overlapping dataset. In another embodiment, the first subset of the XBRL datasets and the second subset of the XBRL datasets have at least one overlapping dataset.

In some embodiments, the machine learning model comprises a neural network. In some cases, the neural network comprises a plurality of layers. In one embodiment, the neural network includes at least an input layer, a concatenate layer, and a dropout layer, with one example illustrated in FIG. 4. In some embodiments, the XBRL tag suggestion system receives a document (230A), for example, a business document, a reporting document, a compliance document, and/or the like. In some cases, the system can receive the document via interfacing with other systems. In some cases, the system can receive the document via retrieving the document via a data repository (e.g., the XBRL data repository 150 in FIG. 1). In some embodiments, the system is coupled to an electronic filing system via a software interface to receive the document. In some embodiments, the system is configured to use a set of predetermined protocol through the software interface. In some embodiments, the software interface comprises at least one of an application programming interface and a web service interface.

In some cases, the system normalizes the received document (235A) and/or normalizes relevant portions of document. In some cases, the system conducts one or more steps to pre-process the document. In some embodiments, the system identifies tagging sections in the document. In one embodiment, the tagging sections are identified based on a known document format. In one embodiment, the system can extract and aggregate from the tagging sections potentially relevant XBRL metadata, tags, and relationships including, for example, tagged concept, concept value, numeric scale, units of measure, unit numerators, unit denominators, row headers, column headers, document type, filer category, sibling and parent tags, accession number, filing date, XBRL taxonomy, company CIK ("Central Index Key"), company SIC, and/or the like. In some cases, processing a single filing involves processing a set of six (6) or more files. In some cases of iXBRL ("Inline XBRL"), the system may extract the fact information with the html row header from the xhtml file. In some cases of iXBRL, the system may predict the table type. In some cases of traditional XBRL, the system may be provided with the table type as part of the XBRL outline, which is a combination of the schema and label and presentation linkbases. In some cases of traditional XBRL, the system may determine the html row header by matching XBRL outline sections with the html tables. In some cases, the SIC codes are taken from the source of the document (e.g., SEC) and not part of the filing. In some cases, the SIC codes are grouped into a small set of industry groups/categories.

Next, the XRBL tag suggestion system predicts one or more XBRL tags associated with the document using the trained machine learning model (240A). In some embodiments, the system predicts one or more XBRL tags for each tagging section. FIG. 3 is one illustrative example of a document 300 with a predicted/suggested XBRL tag 301. In some embodiments, the system determines one or more confidence values (245A), where each of one or more tags is associated with a respective confidence value.

In some embodiments, the XBRL tag suggestion system applies a multivariable function to the document to determine the confidence values. In one example, the multivariable function is a softmax function. In some embodiments, the softmax function can be applied in a layer of the neural network. In some example, the output of the neural network corresponds to a vector of probabilities which sum to 1 by applying the softmax function.

In some embodiments, the XBRL tag suggestion system generates a representation indicative of the one or more XBRL tags and the one or more confidence values (250A). One example is shown in FIG. 5, which is an illustrative example of a graphical user interface 500. As illustrated, the representation includes suggested XBRL tags 510, each represented by associated respective label, and confidence values 520. In some embodiments, each suggested XBRL tag is associated with a confidence value. For example, the XBRL tag 510_1 is associated with the confidence value 520_1, the XBRL tag 510_2 is associated with the confidence value 520_2, the XBRL tag 510_3 is associated with the confidence value 520_3, and the XBRL tag 510_4 is associated with the confidence value 520_4. In some cases, the representation includes an indicator representing a category of the one or more confidence values, for example, high, medium, and low categories.

In some embodiments, the system may receive an input from the user (255A). In one embodiment, the system may receive an input of selecting one suggested XBRL tag from the one or more suggested XBRL tags associated with the document and/or the document section. In some embodiments, the system may determine a set of selected XBRL tags (260A) and generate an output of the selected XBRL tags (265A). In one embodiment, the system may determine the set of selected XBRL tags based at least in part on the confidence values. In one example, each of the set of selected XBRL tags has a highest confidence value of confidence values corresponding to the group of suggested XBRL tags associated with the same document section. In some embodiments, the system may determine the set of selected XBRL tags based at least in part on user input(s). The selected XBRL tags can be used to tag the document.

Figure 2B:
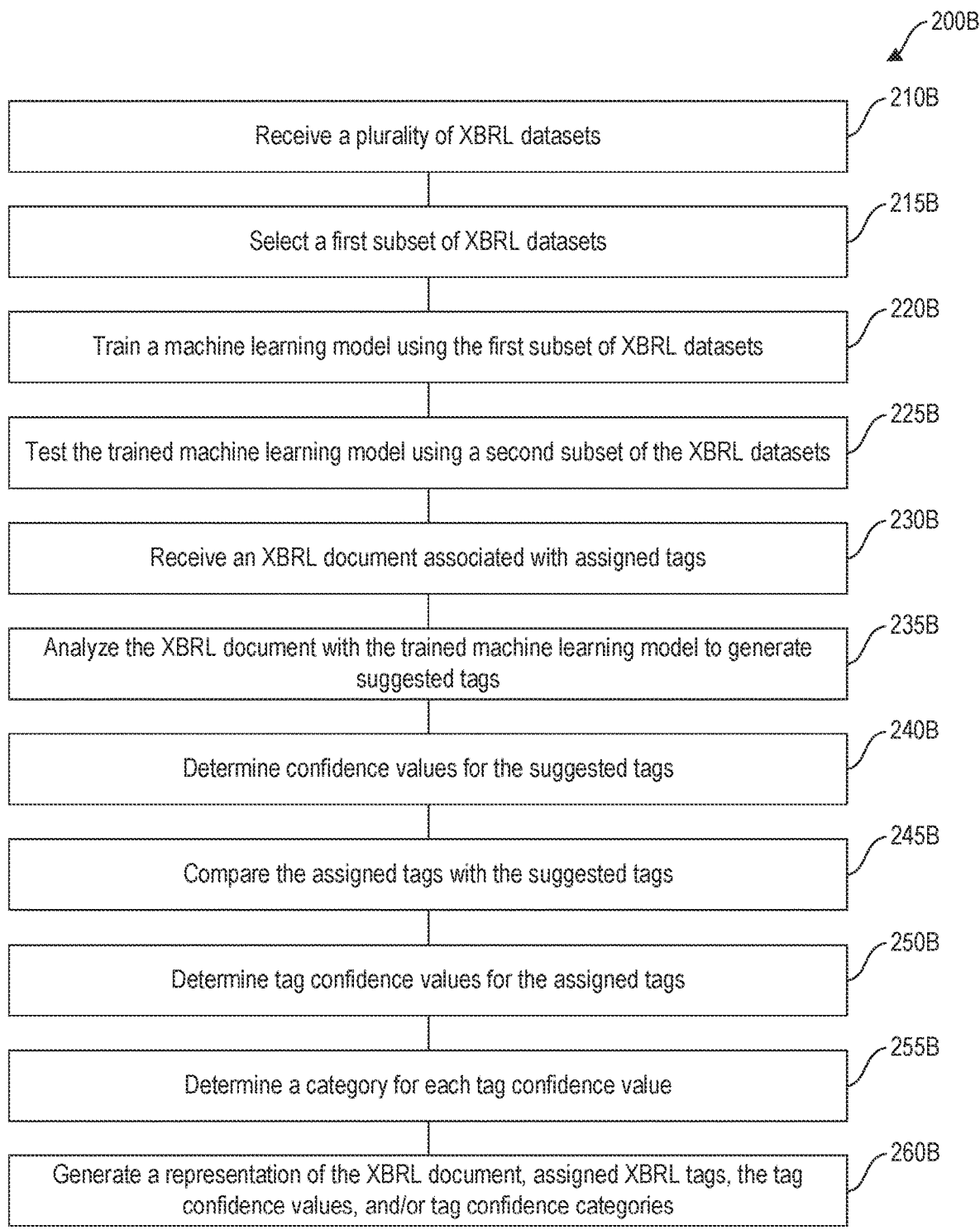
FIG. 2B depicts another illustrative flow diagram of an XBRL tag validation system, in accordance with certain embodiments of the present disclosure.

FIG. 2B depicts one illustrative flow diagram 200B of an XBRL tag validation system, in accordance of certain embodiments of the present disclosure. Aspects of embodiments of the method 200B may be performed, for example, by components of a XBRL tag suggestion system (e.g., components of the XBRL tag suggestion/validation system 100 of FIG. 1). One or more steps of method 200B are optional and/or can be modified by one or more steps of other embodiments described herein. Additionally, one or more steps of other embodiments described herein may be added to the method 200B. In some embodiments, the XBRL tag validation system receives a plurality of XBRL datasets (210B). In some cases, the system may select a first subset of XBRL datasets (215B). In some cases, the first subset of XBRL datasets are selected based on a completeness of the XBRL datasets. In some cases, the first subset of XBRL datasets are selected based on a taxonomy of the XBRL datasets. In some cases, a subset of the XBRL datasets are used for testing (e.g., one third of the XBRL datasets). In some cases, at least a part of the plurality of XBRL datasets each comprises at least one of a row header and a table type. In some designs, the row header is represented by a vector. In some designs, the row header is represented by a dense vector.

In some embodiments, the XBRL tag suggestion system trains a machine learning model using the first subset of XBRL datasets (220B), or the XBRL datasets. The machine learning model may include any suitable machine learning models, deep learning models, and/or the like. In some embodiments, the machine learning model includes at least one of a decision tree, random forest, support vector machine, convolutional neural network, recurrent neural network, and/or the like. In some cases, the system may train the machine learning model using an XBRL datasets. The training process may use, for example, a process illustrated in FIG. 2C. Optionally, the system may test the trained machine learning model using a second subset of the XBRL datasets. In some cases, the XBRL datasets or subsets used for training data are compiled to include row header data with corresponding XBRL data and metadata. The metadata can include SIC codes, table types, and/or the like. In one embodiment, the first subset of the XBRL datasets and the second subset of the XBRL datasets do not have any overlapping dataset. In another embodiment, the first subset of the XBRL datasets and the second subset of the XBRL datasets have at least one overlapping dataset.

In some embodiments, the machine learning model comprises a neural network. In some cases, the neural network comprises a plurality of layers. In one embodiment, the neural network includes at least an input layer, a concatenate layer, and a dropout layer, with one example illustrated in FIG. 4. In some embodiments, the system receives an XBRL document associated with one or more assigned tags (230B). In some cases, the system can receive the XBRL document via interfacing with other systems. In some cases, the system can receive the XBRL document via retrieving the document via a data repository (e.g., the XBRL data repository 150 in FIG. 1). In some embodiments, the system is coupled to an electronic filing system via a software interface to receive the XBRL document. In some embodiments, the system is configured to use a set of predetermined protocol through the software interface. In some embodiments, the software interface comprises at least one of an application programming interface and a web service interface.

In some embodiments, the XBRL tag validation system is configured to analyze the XBRL document using the trained machine learning model to generate one or more suggested XBRL tags (235B). In some embodiments, the XBRL document comprises a plurality of sections, where each assigned tag is associated with a respective section of the XBRL document. In some cases, the system analyzes each section of the plurality of sections and determines one or more suggested XBRL tags for each section. In some embodiments, the system determines a confidence value for each suggested tag of the one or more suggested tags (240B). In some cases, the system applies a multivariable function to generate the confidence values.

In some embodiments, the XBRL tag validation system can compare the one or more assigned tags with the one or more suggested tags (245B) to generate comparison results. The comparison results may include one or more assigned tags matching with one or more suggested tags. The comparison results may include that one or more assigned tags do not match with any suggested tags. In one embodiment, the comparison results may include, for each tagging section associated with a respective assigned tag and one or more suggested tag, whether the respective assigned tag matches any one of the one or more suggested tags.

In some embodiments, the XBRL tag validation system can determine a tag confidence value for each assigned tag of the assigned tags based on the comparison results (250B). In some embodiments, the tag confidence value of an assigned tag is set to equal to the matching suggested tag (e.g., 95%). In some embodiments, the tag confidence value of an assigned tag is set to equal to the matching suggested tag (e.g., 95%) of the one or more suggested tags for the corresponding tagging section. In one embodiment, the tag confidence value of an assigned tag is set to a logical low if the assigned tag does not match any one of the one or more suggested section tags for the corresponding tagging section. In one embodiment, a logical low is represented by 0%.

Optionally, the XBRL tag validation system can determine a category for each tag confidence value (255B). In one embodiment, the tag confidence categories can include a high confidence category, a medium confidence category, and a low confidence category. In one embodiment, each tag confidence category of the tag confidence categories is associated with a predetermined range. For example, a high confidence category corresponds to a confidence value within a range of 40%-100%, a medium confidence category corresponds to a confidence value within a range of 10%-40%, and a low confidence category corresponds to a confidence value within a range of 0%-10%. In another embodiment, the tag confidence categories can include more than three (3) categories. In yet another embodiment, the tag confidence categories can include two (2) categories.

In some embodiments, the XBRL tag validation system can generate a representation of the XBRL document, assigned XBRL tags, the tag confidence values, and/or tag confidence categories (260B). In one embodiment, the representation of the tag confidence values includes an indication of corresponding categories of the tag confidence values. In one example, the tag confidence categories are represented by colors. For example, a high confidence category is represented by green, a medium confidence category is represented by yellow, and a low confidence category is represented by red. FIG. 6 depicts one illustrative example of a representation of an XBRL document with assigned XBRL tags 610 and tag confidence values 620. In one embodiment, an indication of a tag confidence category for each tag confidence value is included in the representation.

Figure 2C:
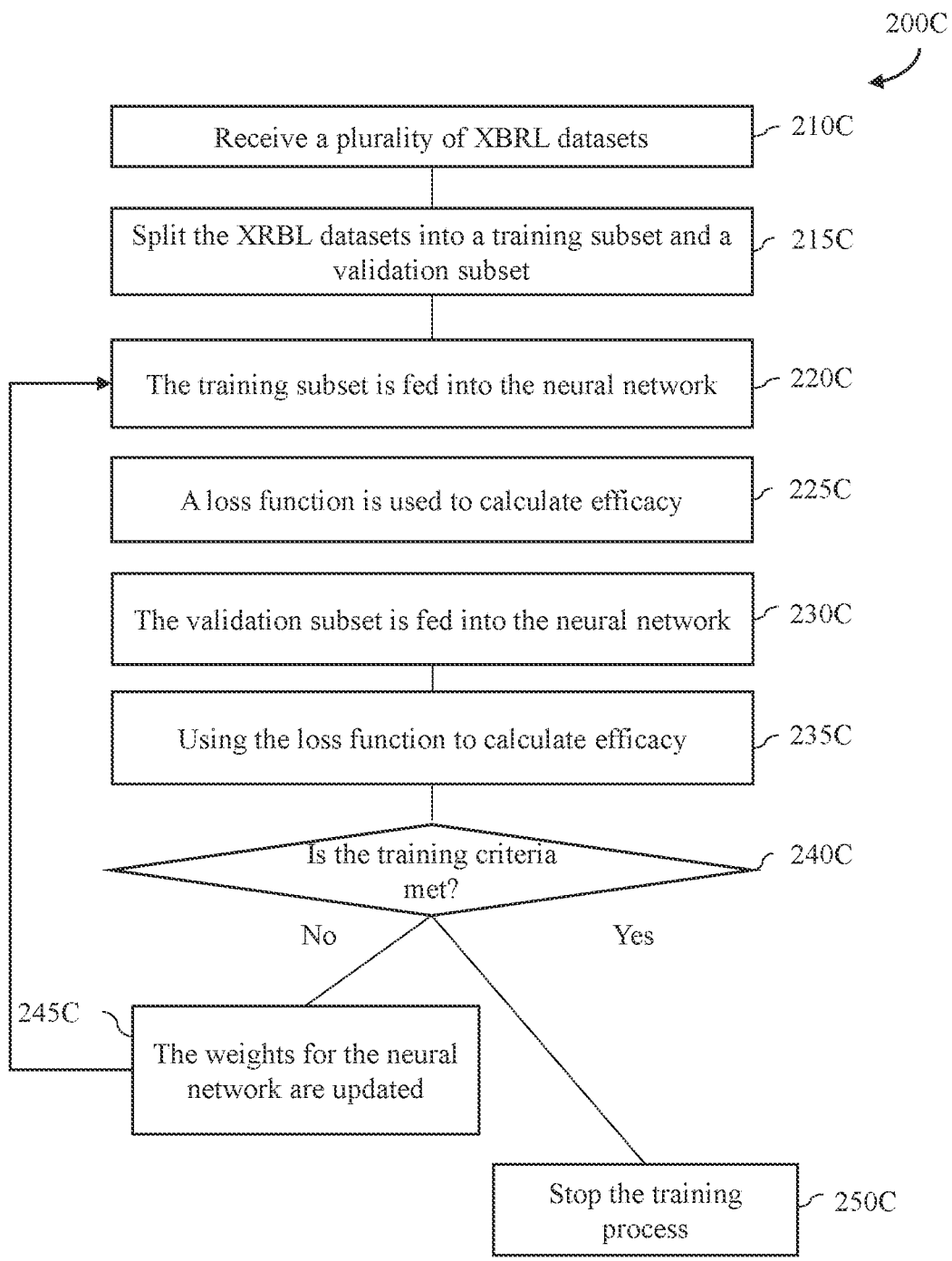
FIG. 2C depicts one illustrative flow diagram of a training process for a neural network used in the XBRL tag suggestion/validation system, in accordance of certain embodiments of the present disclosure.

FIG. 2C depicts one illustrative flow diagram 200C of a training process for a neural network used in the XBRL tag suggestion/validation system, in accordance of certain embodiments of the present disclosure. Aspects of embodiments of the method 200C may be performed, for example, by components of a XBRL tag suggestion system (e.g., components of the XBRL tag suggestion/validation system 100 of FIG. 1). One or more steps of method 200C are optional and/or can be modified by one or more steps of other embodiments described herein. Additionally, one or more steps of other embodiments described herein may be added to the method 200C. In some embodiments, the system receives/collects a plurality of XBRL datasets (210C). In some cases, the received/collected datasets is split into a training subset and a validation subset (215C).

In some embodiments, the training process repeats the following process for a number of epochs. In the context of artificial neural networks, an epoch refers to one cycle through the full training dataset. Within each epoch, the following steps are performed: First, the training subset is fed through the neural network to generate predictions for XBRL tags (220C). A loss function is used to calculate the efficacy of the current neural network weights (225C). In some embodiments, the loss function determines a categorical cross-entropy loss. Optionally, the validation subset is fed into the neural network to generate predictions for XBRL tags (230C). The system can use the loss function to calculate the efficacy of the current neural network weights (235C). The system can check if the predictions using the training and/or validation subset satisfies certain training criterion (240C). In some embodiments, the training criterion is related to repeated failure to reduce loss on the validation subset. For example, the training criterion is when the training fails to improve the efficacy of the neural network by a predetermined number of epochs. In some embodiments, the training criterion is related to the efficacy of the neural network equal to or higher than a predetermined threshold (e.g., 95%). If the training criterion is not met, the weights for the neural network are updated (245C), for example, using the predictions and loss values generated on the training set, and repeat the training process (220C). If the training criterion is met, the training process is stopped (250C).

Figure 4:
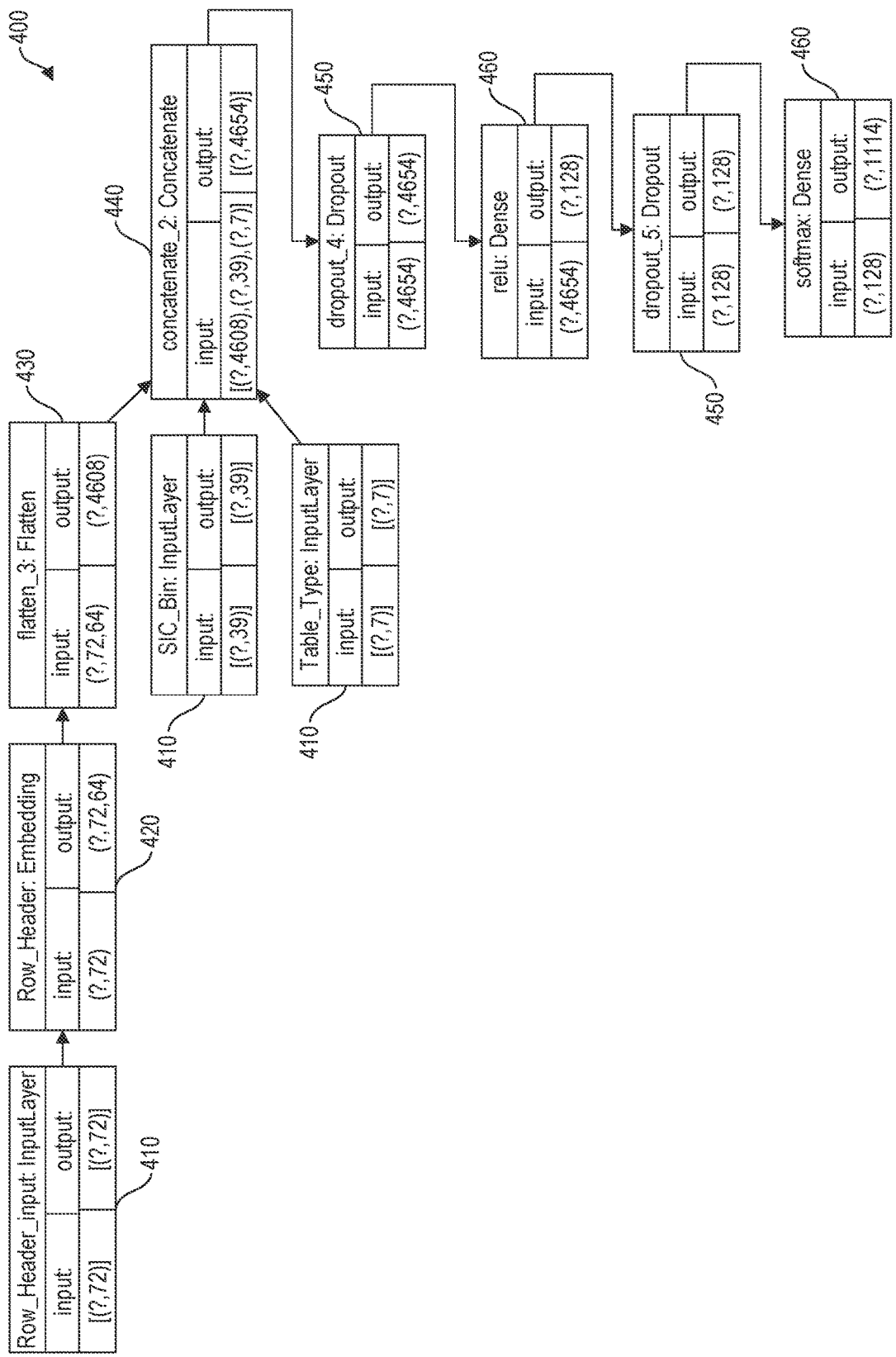
FIG. 4 depicts one illustrative example of a neural network architecture, in accordance of certain embodiments of the present disclosure.

FIG. 4 depicts one illustrative example of a neural network architecture 400, in accordance of certain embodiments of the present disclosure. In this example, the neural network architecture 400 includes input layer(s) 410, an embedding layer 420, a flatten layer 430, a concatenate layer 440, dropout layer(s) 450, and dense layer(s) 460. One or more layers of the neural network architecture 400 are optional and/or can be modified by one or more layers/functions, including other embodiments described herein. Additionally, one or more layers may be added to the neural network architecture 400. In some cases, the input layer 410 captures the inputs to the neural network model. In the example illustrated, the neural network includes multiple input layers 410 (e.g., Row_Header input layer, SIC_Bin input layer, Table_Type input layer).

In some implementations, the embedded layer 420 can be used to compress inputs into a smaller set and is configured to embed certain vectors associated with inputs. In some cases, the embedded vector(s) of the embedding layer 420 are updated during training. In some cases, the flatten layer 430 transforms a multidimensional input into a single vector. In some embodiments, the concatenate layer 440 is configured to concatenate the flattened vectors for each input, such that each input data can be represented as one long flattened vector. In some cases, the dense layer 460 represents a densely-connected neural network layer. In some cases, the dropout layer 450 represents a neural network layer that has the capability of probabilistically removing and re-adding nodes in the layer during training. In some cases, this dropout process helps to avoid memorizing the training data too closely, and thus increases the model's ability to generalize from the data.

Various modifications and alterations of the disclosed embodiments will be apparent to those skilled in the art. The embodiments described herein are illustrative examples. The features of one disclosed example can also be applied to all other disclosed examples unless otherwise indicated. It should also be understood that all U.S. patents, patent application publications, and other patent and non-patent documents referred to herein are incorporated by reference, to the extent they do not contradict the foregoing disclosure.

What is claimed is:

1. A method implemented on a computer system having one or more processors and memories, comprising:

receiving an XBRL document associated with one or more assigned XBRL tags;

analyzing the XBRL document using a trained neural network to generate one or more suggested XBRL tags and determine one or more corresponding confidence values, each suggested XBRL tag of the one or more suggested XBRL tags associated with a confidence value, the trained neural network comprising an input layer, a concatenate layer, and a dropout layer;

comparing the one or more assigned XBRL tags with the one or more suggested XBRL tags to generate comparison results; and determining a tag confidence value associated with each assigned XBRL tag of the one or more assigned XBRL tags based on the comparison results.

2. The method of claim 1, further comprising:
generating a representation of the tag confidence value.

3. The method of claim 1, further comprising:
generating a representation of the XBRL document, the representation of the XBRL document comprising a representation of the one or more assigned XBRL tags and corresponding tag confidence values.

4. The method of claim 2, wherein the representation of the tag confidence value comprising an indication of a category of the tag confidence value.

5. The method of claim 1, wherein the XBRL document comprises a plurality of sections, wherein each assigned XBRL tag of the one or more assigned XBRL tags is associated with a respective section of the XBRL document, wherein each section of the plurality of sections is associated with one or more suggested XBRL tags.

6. The method of claim 5, wherein determining a tag confidence value comprises setting a tag confidence value to a logical low for an assigned XBRL tag if the assigned XBRL tag does not match any one of one or more suggested XBRL tags for a section corresponding to the assigned XBRL tag.

7. The method of claim 1, wherein the trained neural network is trained using a plurality of XBRL datasets.

8. The method of claim 7, wherein at least a part of the plurality of XBRL datasets each comprises at least one of a row header and a table type.

9. The method of claim 8, wherein the row header is represented by a dense vector.

10. A method implemented on a computer system having one or more processors and memories, comprising:
receiving a plurality of XBRL datasets;
training a machine learning model using the plurality of XBRL datasets;
receiving a document; and
predicting one or more XBRL tags associated with the document using the trained machine learning model;
determining one or more confidence values, wherein each predicted XBRL tag of the one or more predicted XBRL tags is associated with a respective confidence value,
wherein each confidence value of the one or more confidence values is associated with a confidence category of a plurality of confidence categories,
wherein the plurality of confidence categories comprise a low confidence category corresponding to a confidence value below 10%.

11. The method of claim 10, wherein at least a part of the plurality of XBRL datasets each comprises at least one of a row header and a table type.

12. The method of claim 11, wherein the row header is represented by a vector.

13. The method of claim 10, further comprising:
identifying one or more tagging sections in the document, wherein each predicted XBRL tag of the one or more predicted XBRL tags is associated with one tagging section of the one or tagging sections.

14. The method of claim 10, wherein determining one or more confidence values comprises applying a multivariable function to the XBRL document to determine the one or more confidence values.

15. The method of claim 14, further comprising:
generating a representation indicative of one or more labels and at least a part of the one or more confidence values, wherein each label of the one or more labels is associated with one predicted XBRL tag of the one or more predicted XBRL tags.

16. The method of claim 15, wherein the representation comprises an indicator representing a confidence category of the plurality of confidence categories associated with one confidence value of the at least a part of one or more confidence values.

17. The method of claim 10, further comprising:
selecting a set of XBRL tags from the one or more XBRL tags based at least in part on the one or more confidence values.

18. The method of claim 17, further comprising:
generating a representation indicative of the set of selected XBRL tags.

19. The method of claim 10, wherein the plurality of confidence categories further comprise a medium confidence category corresponding to a confidence value in a range of 10% to 40%, and wherein the plurality of confidence categories comprise a high confidence category corresponding to a confidence value higher than 40%.

* * * * *